United States Patent
Hampp et al.

(10) Patent No.: US 8,094,361 B2
(45) Date of Patent: Jan. 10, 2012

(54) POLYMER SHUTTER COMPOSITIONS AND DEVICES FOR INFRARED SYSTEMS

(75) Inventors: Andreas Hampp, Santa Barbara, CA (US); Amanda L. Holt, Santa Cruz, CA (US); Justin Gordon Adams Wehner, Goleta, CA (US); Daniel E. Morse, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/652,584

(22) Filed: Jan. 5, 2010

(65) Prior Publication Data

US 2011/0164303 A1   Jul. 7, 2011

(51) Int. Cl.
G02F 1/153 (2006.01)
G02F 1/03 (2006.01)
G02F 1/15 (2006.01)
G09G 3/38 (2006.01)

(52) U.S. Cl. ......... 359/275; 359/245; 359/265; 345/105
(58) Field of Classification Search .......... 359/265–275, 359/277, 245–247, 254, 242; 345/49, 105; 250/70; 438/929
See application file for complete search history.

(56) References Cited

U.S. PATENT DOCUMENTS

| | | | | |
|---|---|---|---|---|
| 4,543,306 A * | 9/1985 | Dubois et al. | | 429/337 |
| 4,893,908 A * | 1/1990 | Wolf et al. | | 359/275 |
| 4,938,571 A * | 7/1990 | Cogan et al. | | 359/275 |
| 5,532,869 A * | 7/1996 | Goldner et al. | | 359/275 |
| 5,995,273 A | 11/1999 | Chandrasekhar | | 359/270 |
| 6,033,592 A | 3/2000 | Chandrasekhar | | 252/62.2 |
| 2004/0229049 A1 | 11/2004 | Boire et al. | | 428/432 |
| 2007/0008603 A1 | 1/2007 | Sotzing et al. | | 359/265 |
| 2010/0002282 A1 * | 1/2010 | Agrawal et al. | | 359/275 |

FOREIGN PATENT DOCUMENTS

WO   WO 2009/120658   10/2009

OTHER PUBLICATIONS

W. J. Crookes-Goodson, L.-L. Ding, Q. L. Huang, J. R. Kimbell, J. Horwitz, M. J. McFall-Ngai, Science 2004, 303, 235.
M. Izumi, A. M. Sweeney, D. G. DeMartini, J. C. Weaver, M. L. Powers, A. R. Tao, T. V. Silvas, R. M. Kramer, W. J. Crookes-Goodson, L. Mathger, R. R. Naik, R. Hanlon, D. E. Morse, J. Roy. Soc. Int. 2009, in press.
K. M. Cooper, R. T. Hanlon, B. U. Budelmann, Cell and Tissue Research 1990, 259, 15.

(Continued)

Primary Examiner — Dawayne Pinkney
(74) Attorney, Agent, or Firm — Baker Botts L.L.P.

(57) ABSTRACT

The present disclosure relates, according to some embodiments, to compositions and devices operable for infra-red transmission and blocking comprising a layered structure having a first electrically conducting layer, a conjugated electrochromic polymer layer, an electrolyte layer and a second electrically conducting layer, wherein the first and second electrically conducting layers have an infrared transparency and the conjugated electrochromic polymers may be operable to be electrically switched between a transparent state that transmits infrared light to an opaque state that does not transmit infrared light. In some embodiments, a device of the disclosure may also have one or more outer substrates sandwiching the other layers. Some embodiments relate to single-layered devices. Some embodiments relate to combined layers. Compositions and devices of the disclosure may be integrated into a wide variety of infrared systems for transmission, shuttering and calibration applications.

13 Claims, 7 Drawing Sheets

OTHER PUBLICATIONS

A. R. Tao, D. G. DeMartini, M. Izumi, A. M. Sweeney, A. H. Holt, D. E. Morse, Biomaterials (submitted) 2009.
J. J. Walish, Y. Kang, R. A. Mickiewicz, E. L. Thomas, Adv. Mater. 2009, 21, 3078.
A. C. Arsenault, D. P. Puzzo, I. Manners, G. A. Ozin, Nat. Phot. 2007, 1, 468.
R. D. Rauh, Electrochim. Acta 1999, 44, 3165.
A. A. Argun, A. Cirpan, J. R. Reynolds, Adv. Mater. 2003, 15.
A. Cirpan, A. A. Argun, R. G. C. Grenier, B. D. Reeves, J. R. Reynolds, J. Mat. Chem. 2003, 13.
P. M. Beaujuge, S. Ellinger, J. R. Reynolds, Nat. Mater. 2008, 7, 795.
T. L. Rose, S. D'Antonio, M. H. Jillson, A. B. Kon, R. Suresh, F. Wang, Synth. Met. 1997, 85, 1439.
N. Petit, F. Gervais, P. Buvat, P. Hourquebie, P. Topart, Eur. Phys. J. B 1999, 12, 367.
H. Pages, P. Topart, D. Lemordant, Electrochim. Acta 2001, 46, 2137.
A. Bessiere, L. Beluze, M. Morcrette, V. Lucas, B. Viana, J. C. Badot, Chem. Mater. 2003, 15, 2577.
E. B. Franke, C. L. Trimble, J. S. Hale, M. Schubert, J. A. Woollam, J. Appl. Phys. 2000, 88, 5784.
A. Bessiere, C. Marcel, M. Morcrette, J. M. Tarascon, V. Lucas, B. Viana, N. Baffier, J. Appl. Phys. 2002, 91, 1594.
J. S. Hale, J. A. Woollam, Thin Solid Films 1999, 339, 174.
P. Topart, P. Hourquebie, Thin Solid Films 1999, 352, 243.
P. Chandrasekhar, B. J. Zay, G. C. Birur, S. Rawai, E. A. Pierson, L. Kauder, T. Swanson, Adv. Funct. Mater. 2002, 12.
I. Schwendeman, J. H. Hwang, D. M. Welsh, D. B. Tanner, J. R. Reynolds, Adv. Mater. 2001, 13.
J. Y. Kim, S. H. Kim, H.-H. Lee, K. Lee, A. J. Heeger, Adv. Mater. 2006, 18, 572.
H. Sirringhaus, P. J. Brown, R. H. Friend, M. M. Nielsen, K. Bechgaard, B. M. W. Langeveld-Voss, A. J. H. Spiering, R. A. J. Janssen, E. W. Meijer, P. Herwig, D. M. de Leeuw, Nature 1999, 401, 685.
B. Schwenzer, J. R. Neilson, K. Sivula, C. Woo, J. M. J. FrÈchet, D. E. Morse, Thin Solid Films 2009, 517, 5722.
J. C. deMello, N. Tessler, S. C. Graham, R. H. Friend, Phys. Rev. B 1998, 57, 12951.
X. Wang, B. Shapiro, E. Smela, Adv. Mater. 2004, 16.
J. C. Carlberg, O. Inganas, J. Electrochem. Soc. 1998, 145.
S. I. Cho, W. J. Kwon, S.-J. Choi, K. P., S.-A. Park, K. J., S. J. Son, R. Xiao, S.-H. Kim, S. B. Lee, Adv. Mater. 2005, 17, 171.
V. Jain, H. M. Yochum, R. Montazami, J. R. Heflin, App. Phys. Lett. 2008, 92, 033304.
C. A. Cutler, M. Bouguettaya, J. R. Reynolds, Adv. Mater. 2002, 14.
M. Al-Ibrahim, H. K. Roth, U. Zhokhavets, G. Gobsch, S. Sensfuss, Sol. Energy Mater. Sol. Cells 2005, 85, 13.
M. Ishikawa, M. Ihara, M. Morita, Y. Matsuda, International symposium on polymer electrolytes 1995, 40, 2217.
M. Morita, M. Goto, Y. Matsuda, J. Appl. Electrochem. 1992, 22.
M. Ishikawa, M. Morita, M. Ihara, Y. Matsuda, J. Electrochem. Soc. 1994, 141.
R. C. Agrawal, G. P. Pandey, Journal of Physics D: Applied Physics 2008, 41, 223001.
J. F. Fang, Y. L. Yang, L. Edman, App. Phys. Lett. 2008, 93, 063503.
R. Kumar, J. P. Sharma, S. S. Sekhon, European Polymer Journal 2005, 41, 2718.
Invitation to Pay Additional Fees and Partial International Search Report; PCT/US2011/020065; pp. 7, May 19, 2011.

\* cited by examiner

POLYMER SHUTTER COMPOSITIONS AND DEVICES FOR INFRARED SYSTEMS

STATEMENT REGARDING FEDERALLY SUPPORTED RESEARCH AND DEVELOPMENT

This work was supported in part by a DARPA Grant awarded by the U.S. Army Research Office (Grant No. WF911NF-08-1-0494) and the U.S. Government may therefore have certain rights in this invention.

FIELD OF THE DISCLOSURE

The present disclosure relates, in some embodiments, to compositions and/or devices comprising conjugated electrochromic polymers that are operable to be electrically interchanged from a transparent state to an opaque or non-transparent state and are further operable to transmit infrared light when in the transparent state and block infrared light when in the opaque state. The present disclosure also relates, in some embodiments, to infrared devices and systems that integrate one or more conjugated electrochromic polymer compositions and/or devices of the disclosure for use in a variety of infrared applications (e.g., as non-mechanical infrared light shutters and/or as variable transmittance layers).

BACKGROUND OF THE DISCLOSURE

Infrared (IR) technology is used in a variety of applications, equipment and sensors such as IR spectroscopes, IR detectors, and IR imaging systems configured for use in variety of applications including but not limited to chemical imaging, night vision equipment, weather monitoring, astronomical applications, a variety of cameras and imaging for medical applications. However, even the most sophisticated of these devices still use primitive and bulky mechanical devices for operations such as shuttering of IR light. These bulky devices are typically made of a metal piece and a motor that operates to mechanically move the metal piece over an aperture and function as a shutter. This type of shuttering technology makes the devices bulky, expensive and slow to operate. Furthermore, mechanical shutters are vulnerable to shock and wear which decreases system reliability.

SUMMARY

A need has arisen for improved compositions, devices and/or systems for shuttering and transmitting IR light.

The present disclosure relates, according to some embodiments, to compositions and devices operable for infra-red transmission and blocking comprising one or more electrically conducting layers, a conjugated electrochromic polymer and an electrolyte wherein the electrically conducting layer(s) may have an infrared transparency and the conjugated electrochromic polymers may be operable to be electrically switched between a transparent state that transmits infrared light to an opaque state that does not transmit infrared light. In some embodiments, a device or composition of the disclosure may also comprise one or more outer substrates sandwiching the other components.

In some embodiments, devices and compositions may be multilayered. In some embodiments, devices and compositions may be comprise a single combination layer.

In some embodiments a device or composition of the disclosure, operable for infra-red transmission and blocking, may have a layered structure that may comprise a first outer substrate having a first electrically conducting layer disposed thereon, a conjugated electrochromic polymer layer disposed on the electrically conducting layer of the first outer substrate, an electrolyte layer disposed on the conjugated electrochromic polymer layer, a second electrically conducting layer disposed on the conjugated electrochromic polymer layer, a second outer substrate disposed on the second electrically conducting layer, the first electrically conducting layer and the second electrically conducting layer having an infrared transparency and the conjugated electrochromic polymer operable to be electrically switched between a transparent state that transmits infrared light to an opaque state that does not transmit infrared light.

Conjugated electrochromic polymers comprised in devices of the disclosure may be operable to transmit or block IR wavelengths based on their level of doping. Electricity may be used to change the level of doping in conjugated electrochromic polymers of the present devices that may cause the polymers to be interchangeably transparent or opaque to infrared wavelengths. Accordingly, electrochromic IR shutters devices of the disclosure may be electrically switched from an IR transparent state (IR transmitting mode) to an IR nontransparent state (IR blocking/shuttering mode).

Devices of the disclosure may be operable to operate (transmit/block) over a variety of infrared wavelengths. In some embodiments, midwave infrared light (MWIR) having wavelengths of from about 2 µm to about 6 µm may be transmitted or blocked by devices of the disclosure. In some embodiments, shortwave infrared (SWIR) light having wavelengths of from about 1 µm to about 2 µm may be transmitted or blocked by devices of the disclosure. In some embodiments, long wave infrared light (LWIR) having wavelengths of from about 6 µm to about 15 µm may be transmitted or blocked by devices of the disclosure. It will be understood that the above sections present specific embodiments and that devices of the disclosure may be operable to transmit and shutter any IR wavelength.

Conjugated electrochromic polymers having IR transparency are described in other parts of this application. According to some embodiments, layers of devices comprising conjugated electrochromic polymers may have different thickness.

In some embodiments, an electrolyte layer of a device of the disclosure may comprise salts and ions suitable to conduct and change levels of doping of a conjugated electrochromic polymeric. An electrolyte layer may comprise a solid electrolyte, a liquid electrolyte, an ionic liquid electrolyte and/or a gel electrolytes. A variety of gel electrolytes having different ionic compositions and concentrations are described later in the present specification. In some embodiments, different electrolytes may be used for optimal device performance.

The disclosure also provides methods for making multi-layered devices and single-layered devices for shuttering and transmitting IR light.

In some embodiments, the disclosure further relates to devices and/or systems that operate using IR radiations which incorporate one or more electrochromic polymer based IR devices of the disclosure for shuttering and transmitting IR wavelengths for a variety of calibration and measurement purposes.

This summary contains only a limited number of examples of various embodiments and features of the present disclosure. For a better understanding of the disclosure and its advantages, reference may be made to the description of exemplary embodiments that follows.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to compositions and devices comprising electrochromic conjugated polymers that are operable to transmit and block infrared (IR) waves in response to electrical signals. In some embodiments, compositions and devices of the disclosure may be used as IR transmitters and/or IR shutters and may provide a low-cost and lightweight solution to the otherwise bulky mechanical IR shutters of the art. In some embodiments, devices of the disclosure may provide a more rapid IR shuttering/transmitting functionality. The present polymer-based compositions and devices may be easily incorporated (e.g. by coating) onto existing IR technology platforms and provide an ease of operability for a wide range of infrared technology applications.

Preferred embodiments of the disclosure and its advantages may be best understood by reference to FIGS. 1A-10.

Figure 1A:
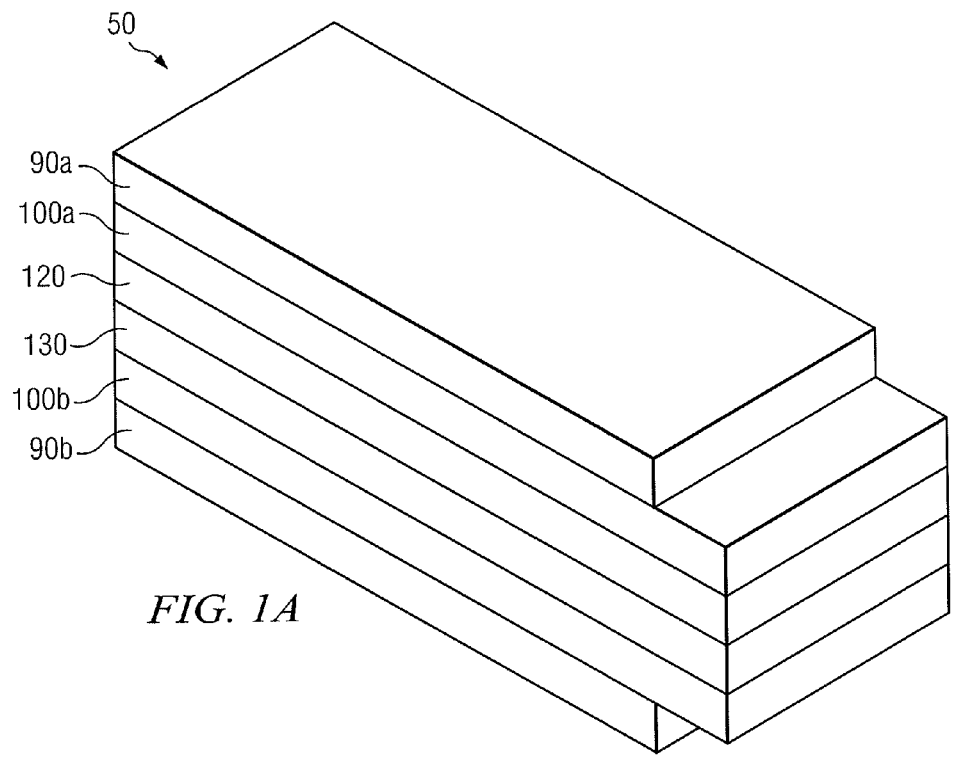
FIGS. 1A and 1B illustrate a layered IR transmission and/or blocking composition/device operable to electronically control infrared transparency, according to a specific example embodiment of the disclosure.

FIG. 1A depicts an example device 50 of the disclosure that may be operable to transmit, filter and/or block infra-red waves. In some embodiments, device 50 may be referred to as composition 50 of the disclosure.

According to some embodiments, device 50 of FIG. 1A may comprise a layered structure having a first outer substrate 90a having a first electrically conducting layer 100a disposed thereon. A conjugated electrochromic polymer layer 120 may be disposed on electrically conducting layer 100a of first outer substrate 90a. An electrolyte layer 130 may be disposed on the conjugated electrochromic polymer layer 120 and a second electrically conducting layer 100b may be disposed on conjugated electrochromic polymer layer 120. A second outer substrate 90b may be disposed on the second electrically conducting layer 100b.

In some embodiments, an electrolyte and a conjugated electrochromic polymer may be both comprised together in a combined layer in the device of FIG. 1A (not expressly depicted). In one embodiment, a technical advantage of a combined layer may also include ease of processing. In one embodiment, a technical advantage of a combined layer may be faster on and off switching speeds of device 50.

In some embodiments, device 50 may be a layered device sandwiched between two outer substrate layers 90a and 90b. In some embodiments, first and second outer substrates 90a and 90b may be comprised of silicon and in some embodiments may be silicon wafers. In some embodiments, first and second outer substrates 90a and 90b may be comprised of a glass. In some embodiments, substrates 90a and 90b may function as supports. In some embodiments, substrates 90a and 90b may function as electrically conductive layers. In some embodiments, device 50 may not have a support or outer substrates 90a and 90b (see for example, FIG. 2).

In some embodiments, substrates 90a and 90b may be transparent to one or more IR wavelengths. In a non-limiting example, substrates 90a and 90b may be comprised of glass for applications that relate to transmission and/or blocking of short-wave infra red (SWIR) wavelengths.

Figure 1B:
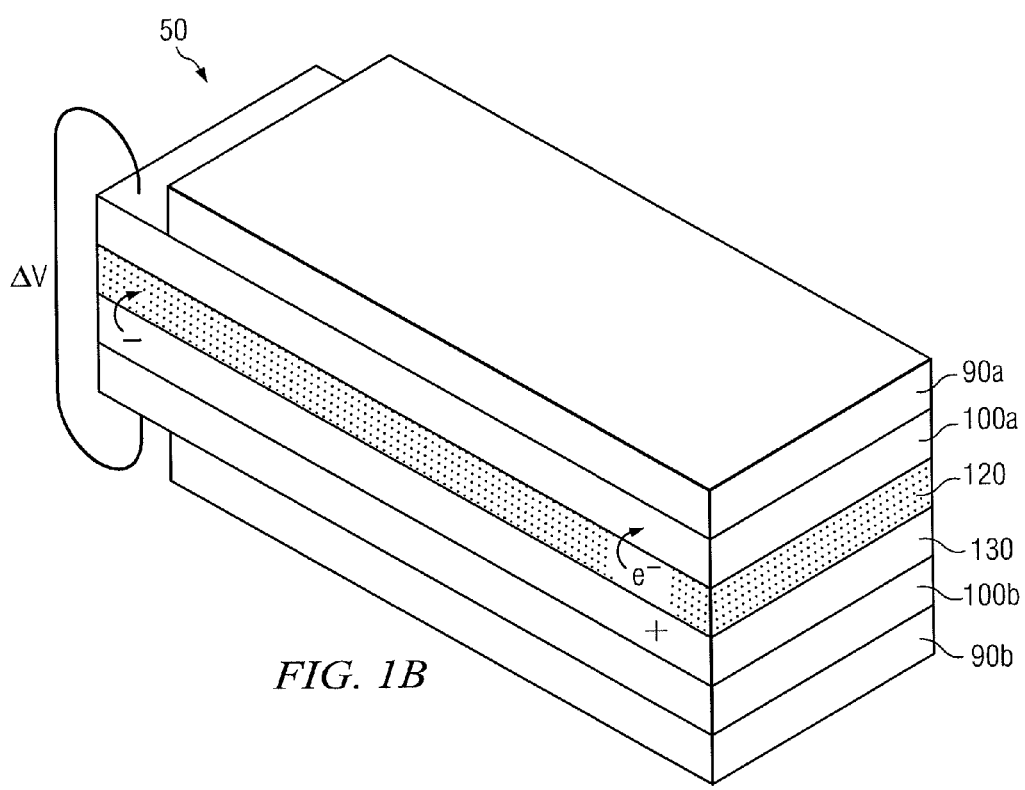

A layered structure or a layered device 50 of the disclosure may be a laminate structure having multiple layers comprised of one or more materials as set forth above and/or in other parts of the specification. In some embodiments, one or more layers may be uniform layers having substantially one type of material. In some embodiments, one or more layers may be combination layers having more than one material together in the layer. In some embodiments, a layer may be a film (e.g., a film of a conjugated electrochromic polymer). In some embodiments, layers may be applied to each other to form a self-supporting device (see for example FIG. 2) or may be applied in between one or more supporting layers (e.g., to form a supported device as depicted in FIGS. 1A and 1B).

The first and the second electrically conducting layers 100a and 100b may be operable to transmit infrared waves (i.e., may have an IR transparency). Exemplary materials that may be comprised in electrically conducting layers 100a and 100b may be indium tin oxide (ITO), carbon nanotubes and/or metal grids. Electrically conducting layers 100a and 100b may be comprised of any material that may be electrically conducting and transparent to an IR wavelength range. In some embodiments, electrically conducting layers 100a and/or 100b may allow electrical contact to be made to each layer of device 50.

In some embodiments, electrically conducting layers 100*a* and/or 100*b* may function as electrodes in device 50. Accordingly, changing the potential or voltage across electrodes 100*a* and 100*b* by application of an external voltage to electrolyte layer 130 may cause changes in levels of doping in a conjugated electrochromic polymer comprised in layer 120 causing a change in IR transparency of the conjugated electrochromic polymer.

As described earlier, conjugated electrochromic polymer layer 120 may comprise conjugated electrochromic polymers that may be operable to be electrically switched reversibly from an IR transparent state that transmits infrared waves to an IR opaque state that does not transmit infrared waves. Electrical, optical and IR properties of conjugated electrochromic polymers may be controllably varied in a reversible manner.

Conjugated electrochromic polymers may also be variously known as conduction polymers, electro-active polymers or semiconducting polymers. Conjugated electrochromic polymers used in devices and compositions the present disclosure may be IR transparent (i.e., have the ability to transmit IR light) at certain doping levels. In some embodiments, doping levels of conjugated electrochromic polymers may cause them to be semiconductors and hence insulators while they are in an IR transparent state. In some embodiments, doping levels of conjugated electrochromic polymers may cause them to be metals when they are in an IR opaque state.

Non-limiting examples of conjugated electrochromic polymers that may be comprised in layer 120 of device 50 include a poly(thiophene), a poly(aniline), a poly(acetylene), a poly(pyrrole), a poly(para phenylene vinylene), and/or combinations thereof and/or chemical variations (such as but not limited to co-polymers), modifications and substitutions thereof. An example poly(thiophene) used in some exemplary devices of the disclosure may be poly(3-hexyl thiophene) (P3HT).

While not wishing to be limited or bound by any theory, as positive voltages are applied across electrically active conjugated electrochromic polymers in layer 120, polymers may be oxidized, leaving lone pairs of electrons in the pi orbitals of the polymer chain (as depicted in FIG. 1B). These lone pairs of electrons may introduce states into the bandgap, and may change doping levels of a conjugated electrochromic polymer, resulting in a semiconductor (and hence an insulator) to metal transition of the polymer and optically from an infrared transparent to an infrared opaque transition.

Positively charged defect states that may be created on a conjugated electrochromic polymer backbone by a doping process may exist in many different forms, such as polarons (coupled radical cations), bipolarons (coupled di-cations) and/or solitons (non-interacting cations). These charged defect states may, in some embodiments, serve as charge carriers in a conjugated electrochromic polymeric system and may be responsible for changes in doping levels and the electrically conductive nature of the polymer. For example, a P3HT electrochromic polymer may become doped in a system electrochemically through charge removal to create polarons, bipolarons and solitons and by subsequent ion insertion.

In some embodiments, infrared changes of electrochromic polymers may be related at least in part to a change in the polymer film thickness and morphology resulting from the influx of ions into the polymer film.

Inorganic compounds such as tungsten trioxide ($WO_3$) have been used for studies on reflection-based electrochromic devices for the mid-infrared as emissivity modulators. Emissivity modulation may refer to changes in IR signatures and/or to changes in IR emission, from an IR source. However, compounds such as $WO_3$ tend to exhibit slow switching speeds and have limited processing capability. In contrast, the present disclosure, in some embodiments, provides infrared electrochromic devices comprising one or more conjugated electrochromic polymers and an electrolyte, comprised in one or more thin films or layers, that can switch rapidly from an insulator like transparent infrared light emitting state to a metal like opaque infrared light blocking state.

In one example embodiment described in detail in sections below, the present inventors have characterized electrochromic properties of a P3HT polymer and found that polymers of P3HT exhibit a change in refractive index in the midwave-infrared region when doped. Furthermore, the present inventors have found that P3HT polymers are very efficient in changing their refractive index and switch efficiently between an IR transparent state and an IR opaque state in the mid-infrared region when doped.

Accordingly, an example embodiment of device 50, made from conjugated electrochromic polymer of a P3HT may function as efficient shutters and transmitters in the midwave-infrared region. In some embodiments, device 50 may be made from other electrochromic polymers and/or combinations of one or more types of electrochromic polymers for shuttering and transmitting shortwave-infrared (SWIR) wavelengths, long-wave infrared (LWIR) wavelengths and mid-wave infra red wavelengths (MWIR). In one embodiment, layer 120 may comprise a poly(aniline) polymer for LWIR shuttering and transmission.

Poly(aniline) polymers have been described in IR reflection-based designs. However, these applications are examples of IR emissivity modulation. For example, poly(aniline) polymers may be present in front of a metallic reflecting surface and an incoming IR wave may be reflected off the metal or absorbed based on the opacity or IR transparency of the polymer. These reflection-based IR emissivity modulation applications are different from the present devices that are operable for reversible IR shuttering and IR transmission.

In some embodiments, a device of the disclosure comprising conjugated electrochromic polymers may be used for electronic control of infrared transparency specifically in IR applications and IR systems that currently require a mechanical shutter. In some embodiments, when electrochromic polymers in layer 120 functions as an IR transmitter up to about 100% of the IR wavelengths may be transmitted through device/composition 50 of the disclosure. In some embodiments, when conjugated electrochromic polymers in layer 120 functions as an IR shutter or an IR blocker, substantially all the IR wavelengths may be blocked by device 50 by switching electrochromic polymer in layer 120 into an opaque state. Accordingly, when an electrochromic polymer in layer 120, functions as an IR blocker or an IR shutter, 0% of the IR wavelengths may be transmitted through device 50 of the disclosure.

Electrolyte layer 130 of device 50 may comprise conducting ions. Example electrolytes that may be used include liquid electrolytes, gel electrolytes, solid electrolytes and ionic liquid electrolytes.

In some embodiments, a gel electrolyte may comprise a base material and a salt. A base material may provide a structural matrix and may comprise a polymer. A base material may also comprise a plasticizer. Non-limiting examples of polymers used to form a base material of a gel electrolyte may include, a poly(vinylidene fluoride), a poly ethylene oxide (PEO), a poly(ethylene glycol) (PEG), a poly(acrylonitrile) (PAN)) and/or any combinations or chemical variants thereof.

Chemical variants may include copolymers. Non-limiting examples of plasticizers may include a propylene carbonate (PC), an ethylene carbonate (EC), a dimethyl farmamide (DMF), a diethyl carbonate (DEC), a dimethyl carbonate (DMC) and/or any combinations or chemical variants thereof.

In some embodiments, a base material may be operable to serve as a structural support. In some example embodiments, a gel electrolyte may comprise base materials of poly(methyl methacrylate) (PMMA), propylene carbonate and ethylene carbonate in weight ratios of 1:0.1:0.4:0.4.

Various salt types may be used to form a gel electrolyte layer 130. Exemplary salts may comprise cations, such as but are not limited to, lithium, sodium and/or a quaternary ammonium salt such as tetrabutyl ammonium (TBA$^+$), tetraethylammonium (TEA) and/or ammonium. Exemplary salts may further comprise anions, such as but are not limited to, tetrafluoroborate (BF$_4^-$), hexafluorophosphate (PF$_6^-$), perchlorate (ClO$_4^-$), p-toluenesulfonate, trifluoromethanesulfonate (triflate) (CF3SO3-), iodide (I—), chloride (Cl—), bromide (Br—), Hexafluoroarsenate (AsF6-), bis(trifluoromethanesulfonyl imide) (N(SO2CF3)2, and/or tris(trifluoromethanesulfonyl methide) (C(CF3SO2)3-)).

In one specific example embodiment, gel electrolyte layer 130 may comprise a base material such as a plasticized poly methyl methacrylate (PMMA) and a salt such as tetrabutyl ammonium hexafluorophosphate.

A gel electrolyte layer 130 layer of a device 50, according to one embodiment, may be formed by depositing a base material and a salt onto an ITO coated silicon (or glass) substrate. Salt concentrations and compositions of electrolyte layer 130 may be changed to optimize operation of device 50.

Factors such as ionic concentration, size, stability and reactivity may affect conductivity of both electrolyte layer 130 and conjugated electrochromic polymer layer 120. These factors may also affect switching speed of device 50. Switching speed may refer to time required to turn-on and/or turn-off device 50 from an IR transparent to an IR opaque state. In some embodiments, switching speeds of device 50 may be improved by using bulk heterojunction and/or layer-by-layer deposition strategies.

Additional example embodiments testing various salts and ionic components of electrolyte layer 130 on one or more aspects of performance of device 50 are described later in sections entitled Examples.

Figure 2:
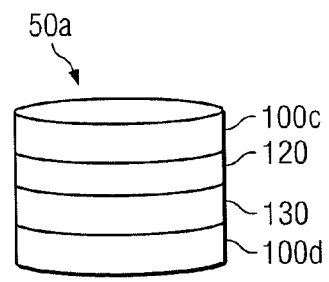
FIG. 2 illustrates another layered IR transmission and/or blocking composition/device operable to electronically control infrared transparency, according to a specific example embodiment of the disclosure.

In some embodiments, device 50a of the disclosure, as shown in FIG. 2, may be a self supporting device and may not have one or more outer substrate or support layers 90. Accordingly, a layer of an electrochromic conjugated polymer 120 and a layer of an electrolyte 130 may be encompassed or sandwiched between a first outer layer of an electrically conducting material 100c and a second outer layer of an electrically conducting material 100d. Electrically conducting layers 100c and 100d may be further operable to transmit infrared light. In some embodiments, 100c and 100d may be made of germanium. In some embodiments, 100c and 100d may comprise doped silicon wafers. Layers 100c and 100d may be comprised of any material that may have an IR transparency and may have electrical conductivity. Applying a voltage to electrolyte layer 130 via electrically conducting layers 100c and 100d may generate a change in conjugated electrochromic polymers comprised in layer 120 that electrically and reversibly switch device 50 between a transparent state that transmits infrared light to an opaque state that does not transmit infrared light.

In some embodiments, where a combined layer comprising electrochromic polymer and gel electrolyte may be used, the combined layer may be referred to as a bilayer. As described above, electrochromic behavior of a bilayer in an exemplary device 50, according to one embodiment, may depend in part on electrochemical doping. Following voltage application, positive ions may travel from an ionic donor in the bilayer into a conjugated electrochromic polymer and aid in oxidation of the polymer by maintaining charge neutrality and through formation of a double layer that may enhance an electric field in the doping region. As set forth earlier, oxidation introduces mid-gap states into the semiconductor's bandgap, altering the color of a polymer and eventually rendering it conducting.

Figure 3A:
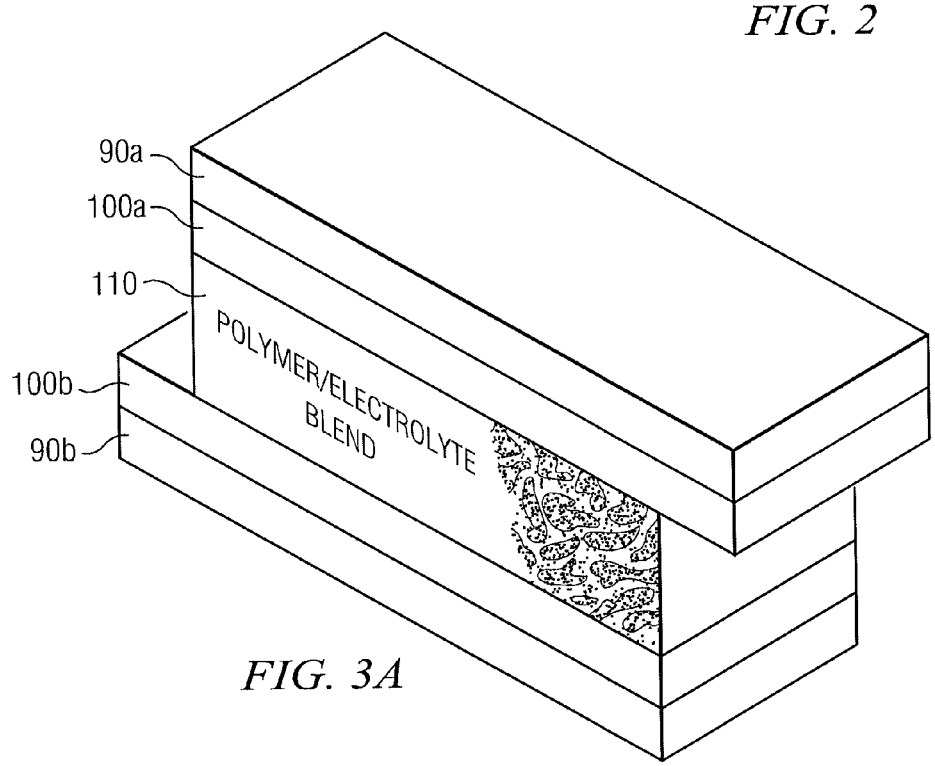
FIGS. 3A and 3B illustrate example single-layered IR transmission and/or blocking composition/devices operable to electronically control infrared transparency, according to a specific example embodiment of the disclosure.
Figure 3B:
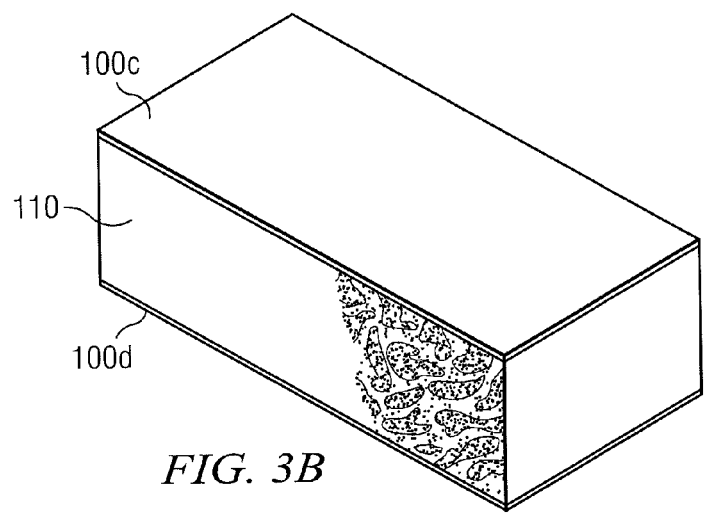

Some embodiments of the disclosure relate to a single-layer device. Example single layer devices 50, as depicted in FIGS. 3A and 3B, may comprise a heterogeneous combination layer 110 comprising one or more types of conjugated electrochromic polymers and an electrolyte. Combination layer 110 of device 50 as shown in FIG. 3A may comprise an outer substrate material 90a and 90b coated further comprising an electrically conducting, IR transparent material 100a or 100b disposed thereon. In some embodiments, 90a and 90b may be comprised of silicon, silicon wafers and/or glass. In some embodiments, 100a and 100b may be comprised of ITO, carbon nanotubes and/or a metal grid.

Combination layer 110 of device 50 as shown in FIG. 3B may comprise an electrically conducting, IR transparent material 100c and 100d disposed thereon. In some embodiments, device 50 of FIG. 3B may be a self-supporting device. In some embodiments, 100c and 100d may be comprised of germanium. In some embodiments, 100c and 100d may be comprised of a doped silicon wafer.

A single-layer device 50 as shown in FIG. 3A or 3B, may be made by blending one or more conjugated electrochromic polymers, an ion conductor (such as but not limited to a poly(ethylene oxide) (PEO)) and a salt (such as but not limited to, tetrabutyl ammonium hexa fluoroborate (TBA BF4)) in a compatible solvent and in a controlled manner. The phase morphology of layer 110 or film 110 formed by the blending may be controlled by factors such as but not limited to, post-deposition thermal annealing; polymer deposition conditions such as ambient humidity, temperature and solution viscosity; and solution additives to facilitate mixing prior to polymer deposition. A single-layer device may have similar functional properties to bilayer electrochromic devices which are described above. One advantage of a single layer device, according to one embodiment, may be reduced ion travel distance as compared to multi-layer devices. For example, heterogeneous blend layer 110 may cause ionic components to be closer to conjugated polymer components resulting in reduced ion travel distance.

In some embodiments, a single-layered device may provide one or more technical advantages such as reducing processing steps, reducing costs and/or simplifying the sandwich structure. Another advantage of a single layer device may be simplification of device manufacturing. In some embodiments, methods of assembling or making a single layer device may comprise deposition of one layer having one or more conjugated electrochromic polymers and one or more electrolytes.

In some embodiment, the present disclosure relates to methods of forming or assembling devices of the disclosure and layers comprised therein. According to some embodiments, a conjugated electrochromic polymer layer 120 may be spin-coated onto an electrically conducting IR transparent material such as 100a, 100b, 100c or 100d. However, several other methods known in the art may be used to deposit polymer films comprising conjugated electrochromic polymer from solution onto such layers.

In one example embodiment, device 50 may be assembled by spin-casting slightly sub-micron thick conducting conjugated electrochromic polymer (e.g., a poly(3-hexyl thiophene) (P3HT)) to form layer 120 onto a first electrically conducting layer 100a (e.g., indium tin oxide (ITO)) coated on substrate 90a (e.g., silicon) and spin-casting a gel electrolyte (e.g., comprising plasticized poly methyl methacrylate (PMMA) and a salt, such as tetrabutyl ammonium hexafluorophosphate) into layer 130 onto a second electrically conducting layer 100b (e.g., ITO) coated onto substrate 90b (e.g., silicon). The two substrates 90a and 90b may be then sandwiched together allowing electrical contact to be made to each layer of device 50 as shown in FIG. 1A.

Embodiments relating to methods of forming device 50 using a gel electrolyte comprised in layer 130 may include depositing or spin-coating conjugated electrochromic polymers onto substrates and/or electrically conducting layers, depositing a gel electrolyte onto substrates and/or electrically conducting layers, and sandwiching together device 50. In some embodiments, a method using sandwiching prevents disruption of existing layers. One exemplary embodiment describing a sandwiching method is set forth in the paragraph above. However, in other embodiments, wherein other types of electrolytes may be comprised in layer 130, one or more layers of device 50 (such as layers 120, 130, 100 and 90) may be applied in a more sequential order over one another rather than sandwiching.

An exemplary method for assembling a single-layer device 50 (shown for example in FIGS. 3A and 3B) may comprise, in one embodiment, depositing a conjugated polymer and an electrolyte blend onto a first electrically conducting substrate 100c such as germanium or doped silicon. A second conducting substrate 100d similar to the first may be then deposited or bonded to the polymer blended layer 110 to make electrical contact. A voltage may then be applied across the layer 110.

Another exemplary method for assembling a single-layer device may comprise, in one embodiment, depositing a conjugated polymer and an electrolyte blend onto or onto a first structural substrate 90a (such as silicon or glass) that is pre-coated or modified with an IR transparent electrically conducting material 100a such as ITO, carbon nanotubes or a metal grid. A second structural substrate 90b that is pre-coated or modified to add an IR transparent and electrically conducting material 100b similar to the first may be then deposited or bonded to the polymer blended layer 110 to make electrical contact. A voltage may then be applied across layer 110.

Devices 50 of the disclosure may be integrated into existing IR systems for example by placing a device at any point in the optical path of an IR imaging system. In some embodiments, a device of the disclosure may be applied to a pre-existing optic element thereby removing the need for a specific shutter element entirely. Exemplary locations for placing a device of the disclosure may be on dewar windows, focusing optics, and/or on the focal plane itself.

Devices of the disclosure may be assembled directly onto an IR system for example by directly coating and/or assembling layers of a device of the disclosure onto a focal plane array of an IR system. In some embodiments, a device of the disclosure may be placed on a lens placed at a location in the beam path of an IR wavelength. In some embodiments, a device of the disclosure may be coated onto a lens in the beam path of an IR wavelength. In some embodiments, devices of the disclosure may enhance speed of IR calibration procedures such as blanking, filtering and transmitting and provide a low cost, low voltage and space saving alternative to mechanical shutters. Current systems rely on mechanical shutters which are bulky and heavy. One or more advantages provided by a device of the disclosure may include reducing system cost, reducing system weight, reducing system volume, reducing operating power requirements, reducing complexity of an IR system and/or increasing reliability of an IR system.

According to embodiments of the present disclosure, devices of the disclosure may be used in a variety of infrared systems and applications such as but not limited to those used in night vision equipment, medical imaging (for detecting cancers, inflammation), industrial equipment, meteorological imaging by weather satellites that use infrared imaging devices to map cloud patterns, chemical imaging and astronomical imaging.

Some specific example embodiments of the disclosure may be illustrated by one or more of the examples provided herein.

Example 1

Preparation of Exemplary Devices of the Disclosure

Figure 4:
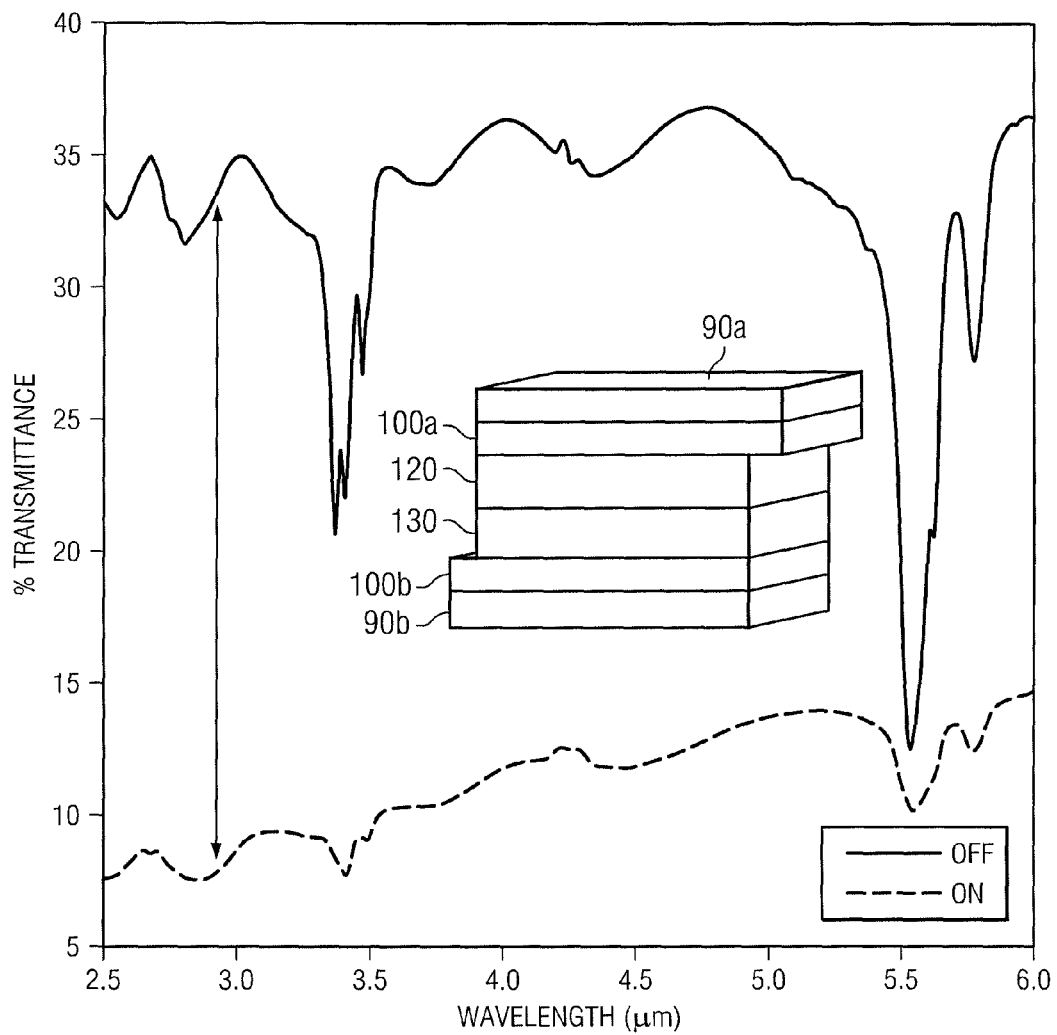
FIG. 4 illustrates a spectrum of an exemplary device as shown in FIGS. 1A and 1B and shows the calculation of optical contrast as a function of percentage transmission versus wavelength at positive voltages (depicted as "on") and at negative voltages (depicted as "off"), according to a specific example embodiment of the disclosure.

Poly(3-hexylthiophene-2,5-diyl) (P3HT) was purchased from Rieke Metals, Inc. All other chemicals were purchased from Sigma Aldrich. As illustrated in FIG. 4, double-sided polished silicon was used as a structural substrate that is transmissive in the infrared region of interest. For electric contact, a thin film of indium tin oxide (ITO) was sputter coated and thermally annealed at 400° C. in nitrogen. P3HT films were spun-cast from chlorobenzene solution and vacuum annealed at 120 C for 1 h. Solution concentrations and spin speeds were varied to produce films with desired thicknesses. The gel electrolyte base is an acetonitrile solution of poly(methyl methacrylate) (PMMA), propylene carbonate and ethylene carbonate in weight ratios of 1:0.1:0.4:0.4. For most experiments, salt was added in a 0.9 M concentration relative to the acetonitrile. The salt types, systematically varied for each device, were comprised of a lithium or tetrabutyl ammonium cation (TBA$^+$) with anions including: tetrafluoroborate (BF$_4^-$), hexafluorophosphate (PF$_6^-$), perchlorate (ClO$_4^-$) or p-toluenesulfonate. In some experiments, salt concentrations were varied while concentrations of the other electrolyte ingredients were held constant. After spin-coating P3HT and the gel electrolyte on two separate ITO coated silicon substrates, the sides were sandwiched together slightly offset to facilitate application of the electrical contacts and dried in air at room temperature overnight. Germanium substrates were used similarly without modification.

Example 2

Analysis of Device Properties

Electronic properties of exemplary devices as assembled in Example 1 above were tested using a Kiethly 4200 Semiconductor Characterization System. Infrared data were obtained using a Nicolet Magna 850 FTIR spectrometer and a special holder designed for applying voltage without removing devices from the beam path. Film thicknesses was calculated using a Dektak stylus surface profilometer (Dektak3) and averaged over several measurements. The optical constants of P3HT films (of known film thickness: 500 nm was calculated by modeling the transmission and reflection data using a Lorenzian Oscillator model and oscillators centered on 0.36601, 0.362602 and 0.354262 eV.

As explained earlier, electrochemical doping causes some of the electrochromic characteristics of bilayer polymer devices of the disclosure. Following voltage application, positive ions travel from an ionic donor layer in the gel electrolyte 130 into the electrochromic polymer layer 120 and cause oxidation of the polymer molecules. Oxidation introduces mid-gap states into the semiconductor's bandgap, altering the color of the material and eventually rendering it conducting. As modeled, the real part of the refractive index of P3HT at 4 microns changes 0.04 units with partial doping while the imaginary part changes from near zero to 0.07. IR transmission mode electrochromic devices of the disclosure were tested by using ITO coated double polished silicon wafers and the ITO resistivity was found to average about 1 kΩ/□ which is low enough to have reasonable transmission in the IR 2-6 micron region. IR transmission mode electrochromic devices with germanium wafers (such as depicted in FIG. 2) were tested and found to have a resistivity of from about 40 kΩ/□ to about 80 kΩ/□.

Ion dynamics of IR electrochromic devices may be controlled in part by ionic conductivity in the electrolyte, ion movement and charge mobility through the polymer film and electron transfer at the electrodes. Although electronic and ionic dynamic properties are difficult to separate, ion dynamics of IR devices of the disclosure and their optical contrast may be controlled in part by the voltage applied, the nature of the conjugated electrochromic polymer, polymer layer thicknesses, electrolyte composition, electrolyte film thicknesses and ionic concentrations.

FIG. 4 shows an example structure of a transmissive infrared electrochromic device (see inset of FIG. 4) tested by the present inventors. FIG. 4 and also illustrates spectrum of a representative device in its "on" and "off" state. "On" voltages are positive and "off" voltages are negative with respect to an electrode onto which the polymer is deposited (polymer electrode). The arrow at 3μ (three microns) represents the calculation of optical contrast. The spectrum baseline is air.

Figure 5:
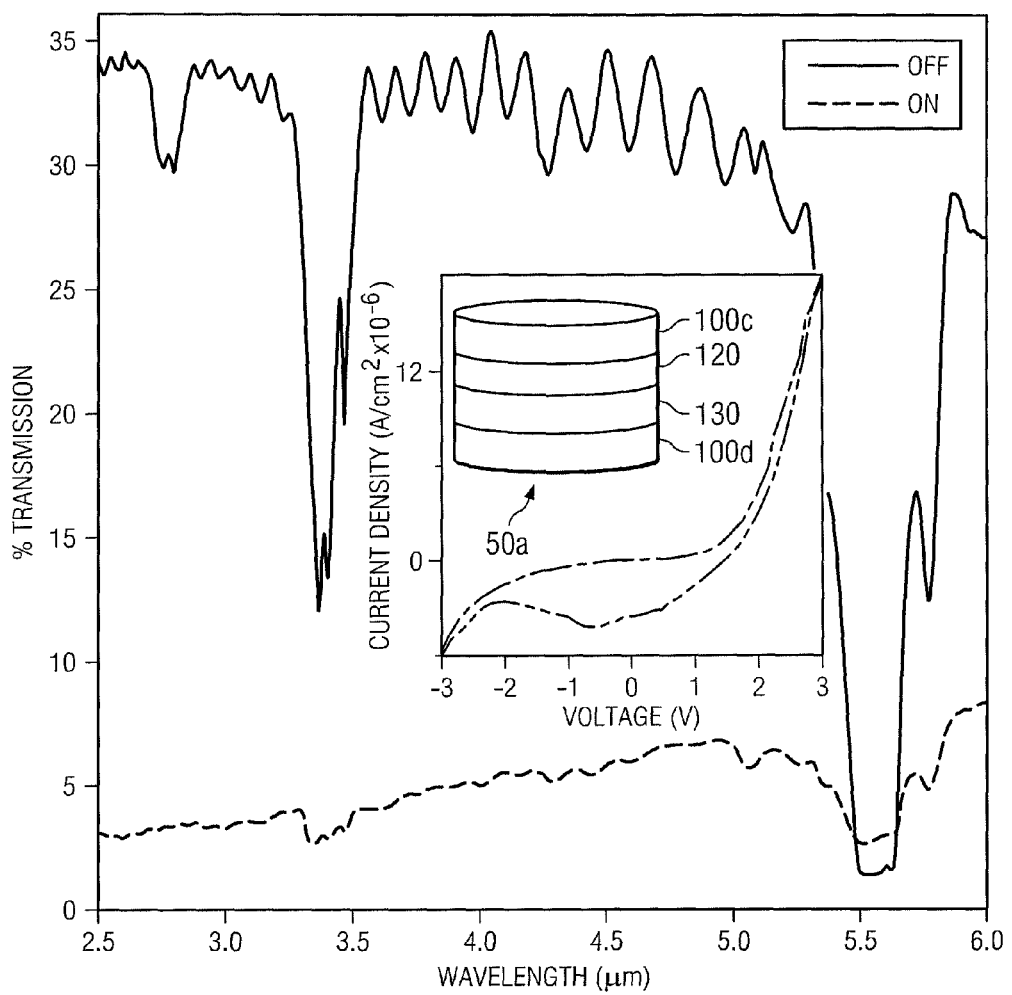
FIG. 5 illustrates a spectrum for an exemplary device as shown in FIG. 2 and shows the calculation of optical contrast as a function of percentage transmission versus wavelength at positive voltages (depicted as "on" or activated) and negative voltages (depicted as "off" or deactivated), the inset graph shows the current/voltage plot and illustrates device structure, according to a specific example embodiment of the disclosure.

FIG. 5 shows another example structure of a transmissive infrared electrochromic device (see inset of FIG. 5) tested by the present inventors built on germanium detailing a sample cyclic voltammogram (i.e., current/voltage plot) in the inset. FIG. 5 also shows transmission spectra of the device built using germanium. The spectrum baseline is air. Features of the spectrum of FIG. 5 include vibrational bands consistent with spectra of P3HT and PMMA-based electrolyte films and interference bands caused by germanium reflections. The observed percent transmission resembles that of silicon or germanium alone when "off" (i.e., when no voltage is applied) and drops significantly when "on". Optical contrast (depicted by the arrow at 3 μm in FIG. 4) is the difference in percent transmission between on and off states at a specific wavelength.

As seen in FIG. 4, example electrochromic devices were tested by applying a voltage across the contracts for a specific period of time. With the application of a positive voltage, the device turns on and upon subsequent application of a negative voltage, the device turns off. Analysis of the "turn-on" and "turn-off" was used to characterize the device dynamics. The turn-off time is the time required for transmission to return to its original state. Once on or off, the polymer film retains its state until voltage is applied again. Real time switching speeds are on the order of seconds and may be measured.

Optical contrasts were measured for several operating voltages and turn on times as well as turn-off voltages and times. In the figures showing data optical contrast (%ΔT) is normalized by the percent transmittance of a device of the disclosure while off and called percent decrease in transmittance. Maximum absolute optical contrasts reached 30% and close to 95% if corrected for device structure (two silicon wafers and an electrolyte).

Figure 6:
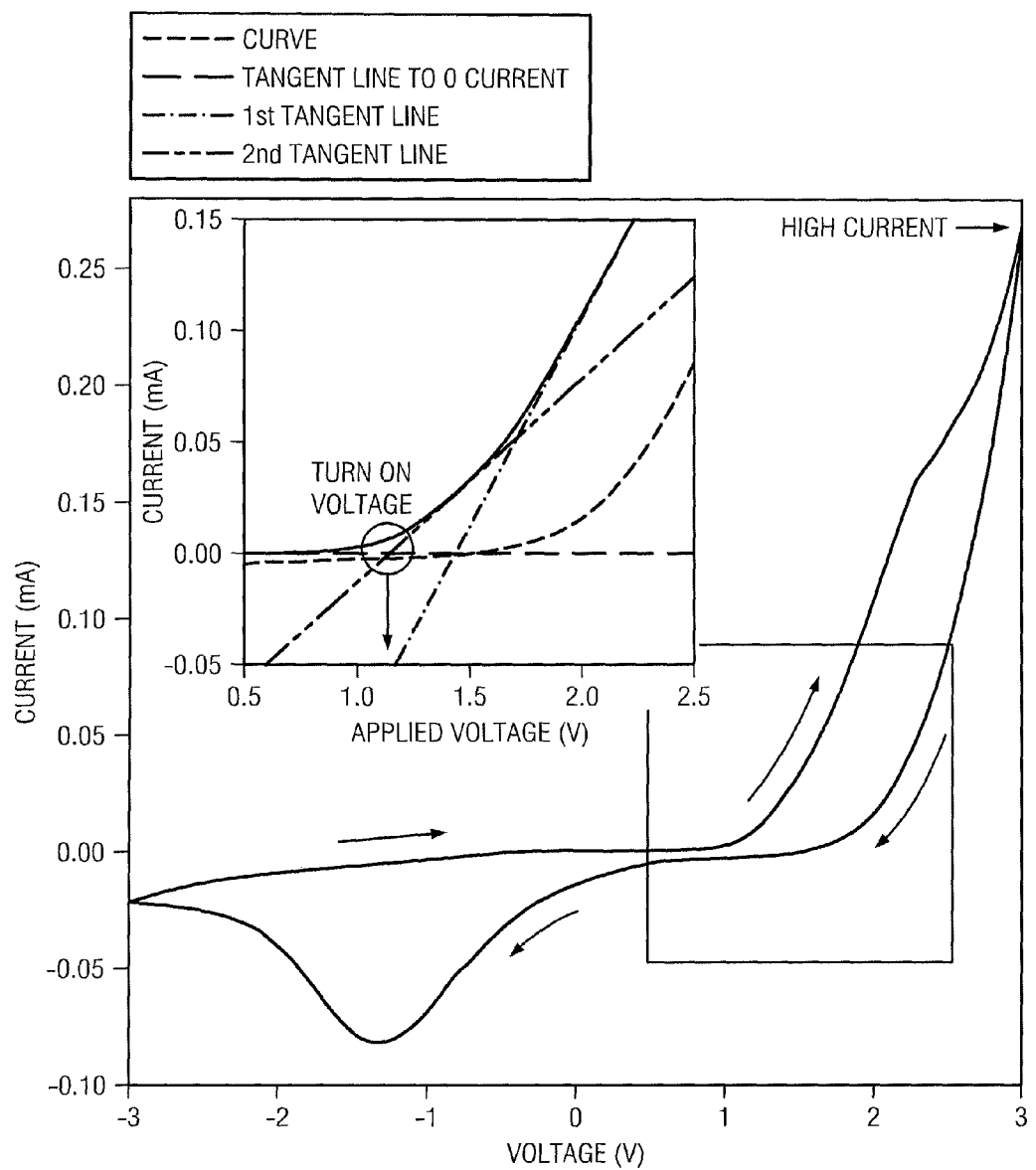
FIG. 6 illustrates a cyclic voltammogram of an example two-electrode device and the insert graph illustrates how the turn-on voltage is calculated, according to a specific example embodiment of the disclosure.

FIG. 6 illustrates a typical cyclic voltammogram of an example 2-electrode device. Cyclic voltammograms were adjusted by device area and plotted versus current densities. Current through a device of the disclosure as a function of voltage as shown in FIG. 6 exhibits a pattern similar to typical cyclic voltammograms in three-electrode electrochemical measurements of classical redox systems. In this case, however, the oxidation and reduction peaks were typically less sharply defined than typically seen for solution based electrochemical experiments.

The inset of FIG. 6 illustrates calculations of the turn-on voltage. The intercept of the line tangent to the curve at the greatest slope with that at the lowest slope were determined. Using this value, a further iteration allowed calculation of the turn-on voltage. In electrochemical experiments, the turn-on voltage corresponds to the electrochemical bandgap of a polymer. This is an intrinsic characteristic of the material that is independent of film thickness, salt type or salt concentration. Turn-on voltages averaged 1.37 V in the positive direction and −0.33 V in the negative direction giving an electrochemical bandgap of 1.7 eV.

The current/voltage plot in FIG. 6 has information on device dynamics of an example device. All devices were first tested at a scan rate of approximately a 200 mV/s. Changing the scan rate shifted the position of the redox peaks in the manner of an electrochemically quasi-reversible process (data not shown). The term "maximum current" in FIG. 6 corresponds to the current at the height of the current/voltage plot and varies as a function of film thickness and salt concentration.

Figure 7:
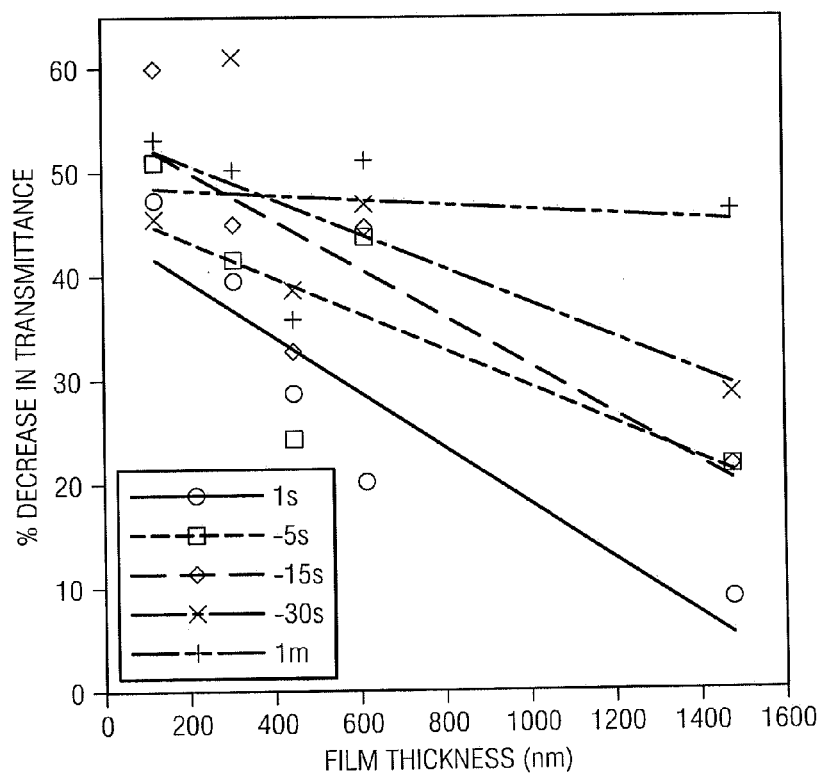
FIG. 7 is a graph of film thickness vs percentage decrease in IR transmittance at 3 microns for an example device of the disclosure comprising P3HT/TBA-$BF_4$ turned on at 2 V for specific amounts of time and where data points are averaged results from many devices, according to a specific example embodiment of the disclosure.

When designing films for use with infrared detection or imaging, film thickness was considered as a possible contributor of both absorption and interference. FIG. 7 shows the percent decrease in transmittance for devices of the disclosure made with TBA-BF$_4$, held at 2 V for specified amounts of time. Data points were averaged results from many devices in and the lines serve as a guide for the eye. While the dynamic optical range (i.e., the percent decrease in transmittance) may be similar for devices ranging from 100-1500 nm in thicknesses, the time required to reach the full decrease in transmittance appeared to increase markedly with thickness. Similarly, for the thickest devices, turning off took up to 5-fold longer time and up to 3-fold greater negative voltages (See Table 1). While this may be resolved to some degree by applying higher voltages for thicker films, greater optical contrasts was not obtained with thicker films even at higher voltages and longer application times.

As listed in Table 1, maximum current may increase for films up to 600 nm but may decrease for films at 1500 nm. This may also be an indication of the lower ionic mobility in the thick films. Furthermore, the absolute transmittances of thicker devices when turned on may not lower than those of thinner devices despite the difference in initial transmittances (which decrease by about 38% from the thickest film to the thinnest).

TABLE 1

Maximum current, average turn off time and average turn off voltage for different salts and salt concentrations. Most of the values in this table are based on linear approximations to experimental data averaged over many devices and may illustrate average trends.

| Anion MW | Cation MW | High current (A/cm$^2$) | Avg. total turn off time (s) | Avg. turn off voltage (V) |
|---|---|---|---|---|
| 86.8 | 242.5 | 0.00060 | 59 | −3.9 |
| 99.5 | 242.5 | 0.00057 | 57 | −3.7 |
| 145.0 | 242.5 | 0.00046 | 49 | −2.8 |
| 171.2 | 242.5 | 0.00039 | 44 | −2.3 |

TABLE 1-continued

Maximum current, average turn off time and average turn off voltage for different salts and salt concentrations. Most of the values in this table are based on linear approximations to experimental data averaged over many devices and may illustrate average trends.

| 86.8 | 6.9 | 0.00010 | 53 | −7.2 |
|---|---|---|---|---|
| 99.5 | 6.9 | 0.00072 | 46 | −4.3 |

| Salt concentration (M) (TBABF4) | High current (A/cm$^2$) | Avg. total turn off time (s) | Avg. turn off voltage (V) |
|---|---|---|---|
| 0.1 | 0.00034 | 22.4 | −2.5 |
| 0.5 | 0.00035 | 23.1 | −2.6 |
| 0.9 | 0.00037 | 23.7 | −2.6 |
| 2 | 0.00041 | 25.5 | −2.6 |
| 4 | 0.00049 | 28.7 | −2.7 |

| P3HT film thickness (nm) | High current (A/cm$^2$) | Avg. total turn off time (s) | Avg. turn off voltage (V) |
|---|---|---|---|
| 1500 | 0.00027 | 80.0 | −6.8 |
| 600 | 0.00051 | 67.9 | −4.1 |
| 450 | 0.00039 | 51.2 | −3.5 |
| 300 | 0.00027 | 34.5 | −3.0 |
| 150 | 0.00016 | 17.8 | −2.5 |

Figure 8:
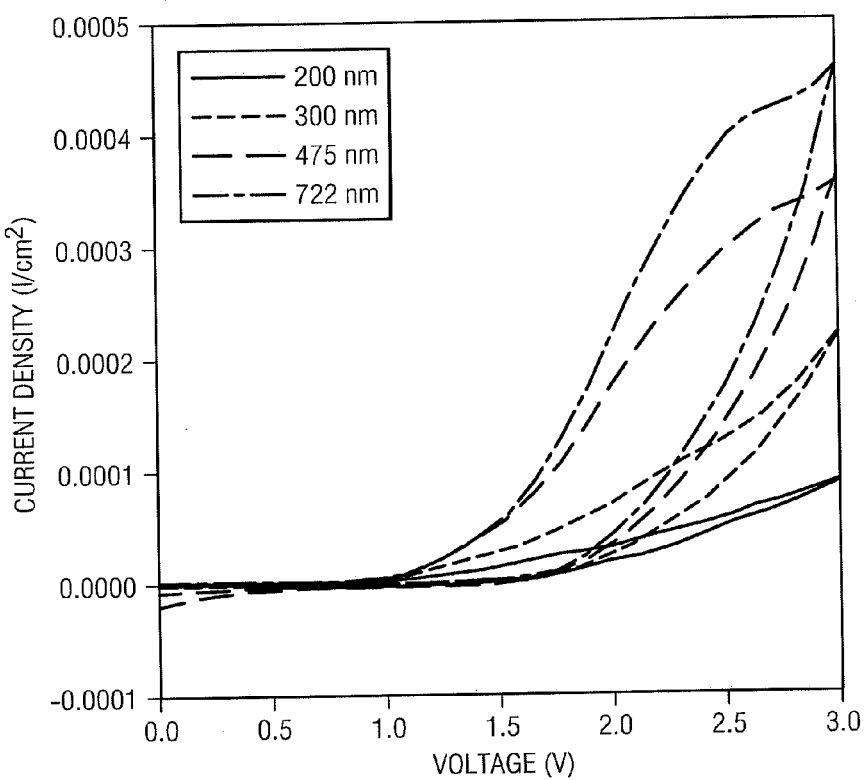
FIG. 8 illustrates positive current vs voltage sweeps for devices of the disclosure having layers of conjugated electrochromic polymers with varying polymer film thickness, according to a specific example embodiment of the disclosure.

FIG. 8 is a graph showing positive current/voltage sweeps for devices of the disclosure having varying polymer film thickness. Thicker films, in some embodiments, may exhibit greater maximum currents and the current/voltage curves may exhibit greater hysteresis (See FIG. 8). Current increases proportionally with the rate of increase in the amount of doped polymer. The larger hysteresis may be a further indication of slower dynamics in thicker film devices.

Figure 9:
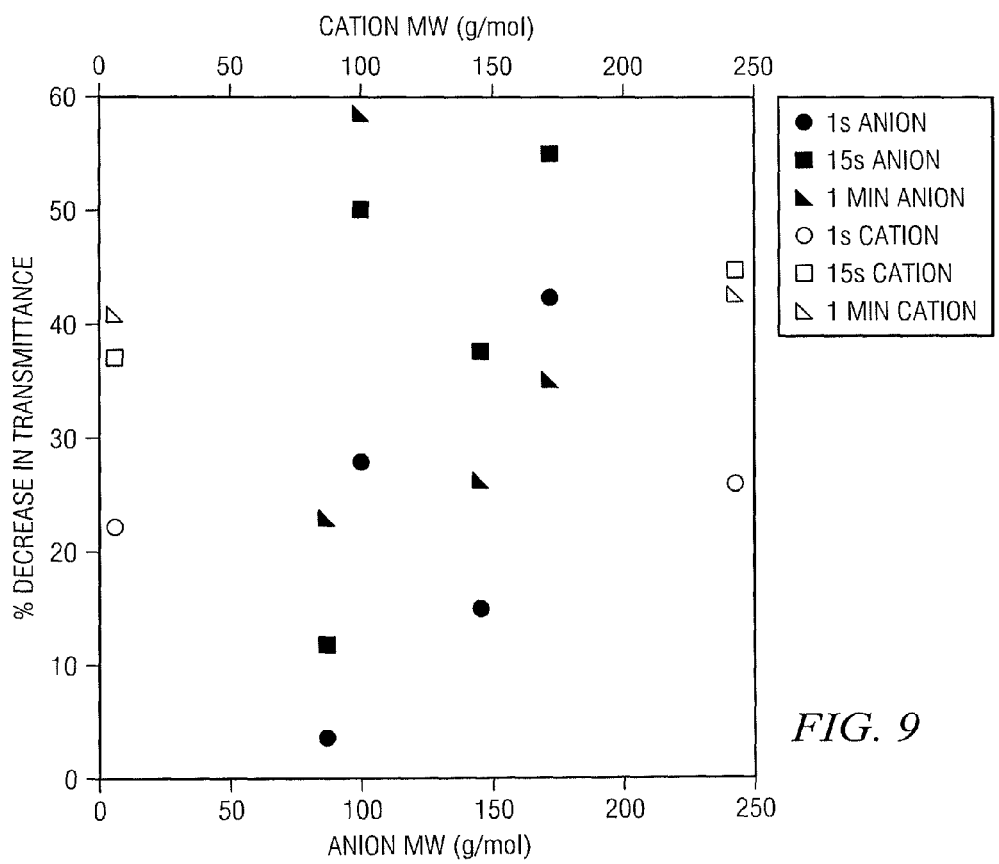
FIG. 9 illustrates a percentage decrease in IR transmittance at 3 microns versus anion and cation molecular weights in exemplary devices of the disclosure having the same conjugated electrochromic polymer film thickness and activated at 2 V for specific times, according to a specific example embodiment of the disclosure.

Other factors that may be optimized for operation of devices of the disclosure include electrolyte composition and salt concentration. While, variances in anion and cation type may not systematically affect the maximum optical contrast, they may change the optimal times and voltages required for operation as ionic conductivities vary directly with ion size. FIG. 9 shows percent decrease in transmittance as a function of anion and cation molecular weights. Smaller anions may reach maximum optical contrast at higher voltages and longer application times.

Table I shows the dependencies of turn-off time and turn-off voltages on salt type and concentration as well as maximum current draw. Similar to the turn-on dynamics, smaller anions and cations turn off at higher voltages and longer application time. In some embodiments, higher the molecular weight of the anion and lower the molecular weight of the cation, the lower the positive maximum current draw in the cyclic voltammogram. Accordingly, it appears that lighter ions support higher rates of doping. Cation and anion dependencies may be interrelated and dynamics of device operation may in part to be dependent on the smallest ion.

Lithium ion-based devices of the disclosure were more difficult to turn off. This effect may be due to an insulating passivation layer formed by the lithium ions at the electrode. Another observation was that salts with organic anions, which exhibited large optical contrasts showed lower switching stability. This may be due to interactions with the organic polymer or electrolyte. In view of these observations subsequent experiments were performed using devices with TBA-based salts and inorganic anions.

Figure 10:
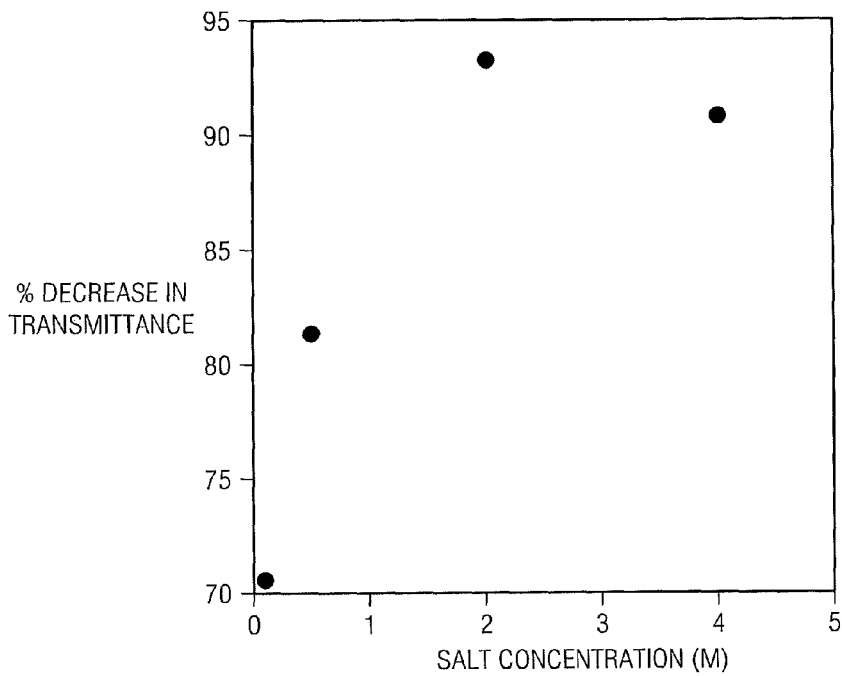
FIG. 10 illustrates a percentage decrease in transmittance versus salt concentration for an example device of the disclosure comprising $TBABF_4$, having the same conjugated electrochromic polymer film thicknesses and activated at 2V for 15 s, according to a specific example embodiment of the disclosure.

Salt concentration significantly affected the optical contrasts of devices of the disclosure that contained 2 M salt concentrations and exhibited optimum contrasts. FIG. 10 shows the percent decrease in transmittance for exemplary devices activated at 2 V for 15 s. At low concentrations, salt limits the optical contrast because the doping front is halted. At higher concentrations, other factors such as ionic interactions and aggregation interfere with the ionic mobility and thus limit the efficiency of doping. Table 1 shows higher current at 3 V for greater salt concentration confirming larger doping profiles. While Table 1 shows that concentrations at these levels do not significantly affect turn-off times or voltages, concentrations much greater than 2 M device dynamics may be negatively affected, showing decreased efficiencies in device operation.

The present disclosure, in some embodiments, describes design of transmissive mid-infrared electrochromic devices that are operable to function as an IR shutter or transmitter. The disclosure also describes some of the factors that may contribute to optimal operation of certain example embodiment devices. Devices of the disclosure comprising conducting electrochromic conjugated polymers for infrared imaging and detection may provide several advantages such as cost reduction, ease of processing, increased physical flexibility, low power operation, freedom from mechanical vulnerabilities and greater space efficiencies.

The present inventors have shown that increasing polymer film thicknesses may not enhance maximum optical contrast. Rather, for spun-cast films at 200 nm, thinner films result in devices with good transmissivity in the "off" state and maximum absorption in the "on" state, as well as the fastest transition times. Salt concentration and composition for optimizing device operation are also described since ionic concentration, size, stability and reactivity were found to affect the conductivity of both the electrolyte and the polymer film thereby affecting the times necessary for turning the device on and off. Slow switching speeds on the order of seconds and longer may be due to restricted ionic movement and may be improved by bulk heterojunction or layer-by-layer deposition strategies. Altering the deposition strategy and polymer type of q polymer film to make it more porous to ionic components as well as increasing the ionic conductivity of a gel electrolyte may be used to obtain faster switching speeds. Optical contrasts at specific wavelengths may be systematically improved using polymers with larger bandgaps and for longer wavelengths by considering polymers with greater conductivities.

As will be understood by those skilled in the art who have the benefit of the instant disclosure, other equivalent or alternative compositions, devices, methods, and systems for IR wavelength transmittance and blocking can be envisioned without departing from the description contained herein. Accordingly, the manner of carrying out the disclosure as shown and described is to be construed as illustrative only.

Persons skilled in the art may make various changes in the shape, size, number, and/or arrangement of parts of devices of the disclosure without departing from the scope of the instant disclosure. For example, gel electrolyte layer may be comprised of different salt compositions and concentrations and/or conjugated electrochromic polymer layer may be thin or thick as described herein. A device of the disclosure may or may not comprise, in some embodiments, a substrate. In addition, the size of a polymeric electrochromic IR device of the disclosure may be scaled up or down to suit the needs and/or desires of a practitioner. Also, where ranges have been provided, the disclosed endpoints may be treated as exact and/or approximations as desired or demanded by the particular embodiment. In addition, it may be desirable in some embodiments to mix and match range endpoints. A device 50 may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the following claims.

What is claimed is:

1. An infrared electrochromic device operable for infra-red transmission and blocking comprising:
a first outer electrically conducting layer and a second outer electrically conducting layer, the first and the second outer electrically conducting layers operable to transmit infrared light;
wherein the first and second outer electrically conducting layers comprise germanium or a doped silicon wafer;
the two outer electrically conducting layers sandwiching a conjugated electrochromic polymer layer and a gel electrolyte layer;
wherein the gel electrolyte layer comprises a base material and a salt;
wherein the salt further comprises an anion of tetrafluoroborate ($BF_4^-$), hexafluorophosphate ($PF_6^-$), perchlorate ($ClO_4^-$) or p-toluenesulfonate, trifluoromethanesulfonate (triflate) (CF3SO3-), iodide (I—), chloride (Cl—), bromide (Br—), hexafluoroarsenate (AsF6-), bis(trifluoromethanesulfonyl imide) (N(SO2CF3)2 or tris(trifluoromethanesulfonyl methide) (C(CF3SO2)3-));
the two outer electrically conducting layers, conjugated electrochromic polymer layer and electrolyte layer as combined being self supporting; and
the conjugated electrochromic polymer layer comprising one or more electrochromic polymers operable to be electrically switched between a transparent state that transmits infrared light to an opaque state that does not transmit infrared light.

2. A device according to claim 1, wherein the infra-red wavelength comprises midwave-infrared light having a wavelength of from about 2 μm to about 6 μm.

3. A device according to claim 1, wherein the infra-red wavelength comprises shortwave-infrared light having a wavelength of from about 1 μm to about 2 μm.

4. A device according to claim 1, wherein the infra-red wavelength comprises longwave-infrared light having a wavelength of from about 6 μm to about 15 μm.

5. A device according to claim 1, wherein the conjugated electrochromic polymer layer comprises a poly(thiophene), a poly(aniline), a poly(acetylene), a poly(pyrrole), a poly(para phenylene vinylene), a combination, or a chemical variation thereof.

6. A device according to claim 5, wherein the conjugated electrochromic polymer layer comprises a poly(3-hexyl thiophene) (P3HT) or a chemical variation thereof.

7. A device according to claims 1, wherein the electrolyte layer comprises a liquid electrolyte, an ionic liquid electrolyte, a gel electrolyte or a solid electrolyte.

8. A device according to claim 1, wherein the base material comprises a polymer.

9. A device according to claim 8, wherein the polymer comprises a poly-methy methacrylate, a poly(vinylidene fluoride), a poly ethylene oxide (PEO), a poly(ethylene glycol) (PEG), a poly(acrylonitrile) (PAN)), a combination thereof or a chemical variant thereof.

10. A device according to claim 1, wherein the base material further comprises a plasticizer.

11. A device according to claim 10, wherein the plasticizer comprises a propylene carbonate (PC), an ethylene carbonate (EC), a dimethyl farmamide (DMF), a diethyl carbonate (DEC), a dimethyl carbonate (DMC), a combination thereof or a chemical variant thereof.

12. A device according to claim 1, wherein the salt comprises a cation of lithium, sodium or a quaternary ammonium salt.

13. An infrared electrochromic device operable for infrared transmission and blocking comprising:
a single combined layer comprising:
at least one conjugated electrochromic polymer; and
at least one a gel electrolyte;
wherein the gel electrolyte comprises a base material and a salt;
wherein the salt further comprises an anion of tetrafluoroborate ($BF_4^-$), hexafluorophosphate ($PF_6^-$), perchlorate ($ClO_4^-$) or p-toluenesulfonate, trifluoromethanesulfonate (triflate) (CF3SO3-), iodide (I—), chloride (Cl—), bromide (Br—), hexafluoroarsenate (AsF6-), bis(trifluoromethanesulfonyl imide) (N(SO2CF3)2 or tris(trifluoromethanesulfonyl methide) (C(CF3SO2)3-));
the at least one conjugated electrochromic polymer operable to be electrically switched between a transparent state that transmits infrared light to an opaque state that does not transmit infrared light;
the single combined layer having at least one electrically conducting material operable to transmit infrared light deposited onto the single combined layer;
the electrically conducting material comprises germanium or a doped silicon wafer; and
the at least one electrically conducting layer and the single combined layer being self supporting.

* * * * *